UNITED STATES PATENT OFFICE.

NELSON C. BISSELL, OF MODESTO, CALIFORNIA.

COMPOSITION FOR WATERPROOFING CLOTH.

1,391,934. Specification of Letters Patent. Patented Sept. 27, 1921.

No Drawing. Application filed October 7, 1920. Serial No. 415,398.

*To all whom it may concern:*

Be it known that I, NELSON C. BISSELL, a citizen of the United States, residing at Modesto, county of Stanislaus, State of California, have invented certain new and useful Improvements in Compositions for Waterproofing Cloth; and I do declare the following to be a full, clear, and exact description of the same.

This invention relates to improvements in waterproofing substances, being particularly adapted to be applied to the material of which automobile tops and the like are constructed, and which are constantly exposed to all kinds of weather. The principal object of my invention is to provide a substance, inexpensive of manufacture and easy of application, which will effectually waterproof the mohair or kindred textile used for the top, etc., without the danger of the goods cracking when folded due to its having lost its pliability. In other words, the material to which my substance is applied does not become stiff and rigid by so treating it, but retains whatever flexibility it originally possessed.

The principal ingredients used in the preparation of my composition are gasolene, asphaltum, paraffin and rubber.

The above ingredients are thoroughly mixed together, this being done for convenience and ease of handling in separate stages, the gasolene being the solvent for the other ingredients which makes it easier to more thoroughly combine them, besides giving a final result which may be readily painted or flowed onto the goods.

The asphaltum and some gasolene then are mixed together first to dissolve the asphaltum, the proportions used being 5 gallons of gasolene to 20 pounds of asphaltum.

The paraffin and some gasolene are then mixed together separately for the same purpose—to dissolve the paraffin, the proportions being 5 gallons of gasolene to 3¼ pounds of paraffin.

The resultant solutions are then thoroughly mixed together, after which about one pint of vulcanizing rubber dissolved in 1 gallon of gasolene is added. This vulcanizing, or liquid rubber as it is sometimes called, consists usually of fine Pará rubber dissolved in a suitable solvent so as to be a semi-fluid substance.

When the ingredients are thus combined, the substance is ready to apply to the cloth, and will impart waterproofing qualities to it, besides coloring it a deep and fast black and imparting a soft gloss thereto.

Two coats or applications are usually sufficient, enough time being allowed between each coat to allow the gasolene to entirely evaporate.

Should it be desired, certain pigments may be added to impart color to the waterproofed cloth.

The asphaltum gives the color to the substance, and provides the "body" which fills the pores of the cloth.

The paraffin keeps the asphaltum from becoming sticky from the heat of the sun, keeps the cloth pliable and tends to produce a glossy effect and also adds to the waterproofing qualities. The rubber adds to the gloss and to the waterproofing, and acts as a binder. It also tends to prevent separation or precipitation of the paraffin and asphaltum in solution, from long standing.

The principal function of the gasolene, as before indicated, is to serve as the common solvent and to form the substance as a thin liquid which may be easily manipulated with a brush so that the solid matter in suspension may thoroughly penetrate the pores of the cloth.

It is to be understood that while I have given certain definite quantities of the ingredients, these may be varied somewhat without departing in any way from the spirit of the invention, as defined by the appended claims.

Having thus described my invention, what I claim as new and useful and desire to secure by Letters Patent is:—

1. A composition for waterproofing cloth consisting of asphaltum, paraffin and liquid rubber mixed together in the proportions of 20 pounds of asphaltum, 3¼ pounds paraffin and 1 pint vulcanizing rubber, and a common solvent for said ingredients.

2. A composition for waterproofing cloth consisting of asphaltum, paraffin and liquid rubber mixed together in the proportions of 20 pounds asphaltum, 3¼ pounds paraffin and 1 pint vulcanizing rubber, and 11 gallons of volatile solvent in which said ingredients are dissolved.

In testimony whereof I affix my signature.

NELSON C. BISSELL.